(12) United States Patent
Laoutid et al.

(10) Patent No.: US 9,850,429 B2
(45) Date of Patent: Dec. 26, 2017

(54) FIRESTOP MATERIAL

(75) Inventors: Fouad Laoutid, Alès (FR); Jean Sauttreau, St Martin de Valgalgues (FR); Laurent Bergogne, Nimes (FR)

(73) Assignee: COMPART SAS, Ales (FR)

( * ) Notice: Subject to any disclaimer, the term of this patent is extended or adjusted under 35 U.S.C. 154(b) by 374 days.

(21) Appl. No.: 11/658,016

(22) PCT Filed: Jul. 22, 2005

(86) PCT No.: PCT/FR2005/001907
§ 371 (c)(1),
(2), (4) Date: Dec. 10, 2007

(87) PCT Pub. No.: WO2006/018523
PCT Pub. Date: Feb. 23, 2006

(65) Prior Publication Data
US 2008/0203348 A1    Aug. 28, 2008

(30) Foreign Application Priority Data
Jul. 22, 2004   (FR) ..................... 04 51611

(51) Int. Cl.
*A62D 1/02* (2006.01)
*C09K 21/14* (2006.01)
*C08G 18/48* (2006.01)
*C08J 9/00* (2006.01)
*C09K 21/02* (2006.01)
*C08G 101/00* (2006.01)

(52) U.S. Cl.
CPC ............ *C09K 21/14* (2013.01); *A62D 1/0071* (2013.01); *C08G 18/48* (2013.01); *C08J 9/0066* (2013.01); *C09K 21/02* (2013.01); *C08G 2101/0025* (2013.01); *C08G 2101/0083* (2013.01); *C08J 2375/04* (2013.01)

(58) Field of Classification Search
CPC ..... C08J 9/0066; C08J 2375/04; C09K 21/02; C09K 21/14
USPC ......... 428/317.9, 319.1; 252/3; 521/99, 103, 521/108, 137, 903
See application file for complete search history.

(56) References Cited

U.S. PATENT DOCUMENTS

| | | | |
|---|---|---|---|
| 3,931,064 A * | 1/1976 | Ray ...................... C08J 9/0066 | |
| | | | 521/103 |
| 4,002,580 A * | 1/1977 | Russo ........................... 521/171 |
| 4,266,042 A * | 5/1981 | Park .............................. 521/123 |
| 4,698,369 A * | 10/1987 | Bell .............................. 521/103 |
| 4,722,945 A * | 2/1988 | Wood et al. ...................... 521/65 |
| 5,173,515 A | 12/1992 | Von Bonin et al. |
| 5,639,800 A * | 6/1997 | von Bonin et al. .......... 521/103 |
| 2002/0020827 A1 | 2/2002 | Munzenberger et al. |
| 2004/0116545 A1 * | 6/2004 | Jakobstroer et al. ......... 516/115 |

FOREIGN PATENT DOCUMENTS

| | | |
|---|---|---|
| DE | 39 40 907 | 6/1990 |
| DE | 197 02 760 | 7/1998 |
| DE | 203 03 672 | 4/2004 |
| EP | 450693 A1 * | 10/1991 |
| WO | WO 2005/003254 | 1/2005 |

\* cited by examiner

*Primary Examiner* — Hai Vo
(74) *Attorney, Agent, or Firm* — Fitch, Even, Tabin & Flannery, LLP

(57) ABSTRACT

The invention relates to a firestop material consisting of a polymer foam, notably a polyurethane foam, containing flame-retardant means. This firestop material is characterized in that the flame-retardant means consist of means designed to form a charred layer on the foam surface, under the effect of a rise in the temperature of the material resulting from a fire, and are supplemented by at least one inorganic type flame retardant. The invention furthermore relates to a chemical composition intended, after expansion and drying, to form such a firestop material, and to a use of such a firestop material.

4 Claims, No Drawings

FIRESTOP MATERIAL

FIELD OF THE INVENTION

The invention relates to a firestop material consisting of a polymer foam, notably a polyurethane foam, comprising no halogenated compound and containing flame-retardant means. This invention furthermore relates to a chemical composition intended, after expansion and drying, to form such a firestop material, and to a use thereof.

This invention relates to the sphere of materials designed to present fire behaviour properties, more particularly, on the one hand, fire resistance properties and, on the other hand, fire reaction properties (ability of such a product to participate in a fire).

BACKGROUND OF THE INVENTION

Products of this type, that come in form of a foam referred to as "firestop", more particularly based on a polyurethane foam, are already known.

In this connection, it can be observed that a virgin polyurethane foam however involves the drawback of emitting flaming drops in case of a fire.

In order to overcome this drawback, it is well known to add to such a polyurethane foam flame-retardant agents, usually made from halogenated compounds. In this connection, it can be noted that it is particularly difficult to produce a foam containing such halogenated compounds and presenting satisfactory reaction and resistance to fire.

Furthermore, the use of such halogenated compounds involves environmental pollution problems and causes, upon combustion of the foam, uncontrolled discharges to the atmosphere and, more particularly, the release of large amounts of dense and toxic fumes. It can furthermore be noted that, in case a chlorine-based halogenated compound is used, the fumes of such a retarding agent combine with the water thrown out by firemen and form hydrochloric acid, which is particularly corrosive and likely to imperil these firemen.

There are also polyurethane foams that, in order to have a good fire behaviour, are made from halogenated or phosphorus-containing polyols. These polyols involve a certain number of drawbacks notably linked with polluting discharges of the aforementioned type, with a particularly high cost price and with a high viscosity that makes the use of such a polyol particularly complex.

The present invention aims to overcome the drawbacks of the firestop materials of the prior art.

SUMMARY OF THE INVENTION

The invention therefore relates to a firestop material consisting of a polymer foam containing no halogenated compound and comprising flame-retardant means, characterized in that the flame-retardant means are made of means designed to form a cohesive charred layer on the foam surface, for a temperature corresponding to that of a fire, these means forming a charred layer consisting, on the one hand, of at least one physical charring agent intended to form, by itself and in the absence of any interaction with any other constituent of the firestop material, such a charred layer, and on the other hand of at least one reactive charring agent intended to form, by reacting with the polymer of the foam, a charred layer on the material surface and, yet on the other hand, supplemented by at least one inorganic type flame retardant.

According to an additional feature, the polymer foam notably consists of a polyurethane foam made, on the one hand, from at least one polyol (more particularly a polyether polyol or a polyester polyol) and, on the other hand, from at least one isocyanate.

The invention furthermore relates to a chemical composition intended, after expansion and drying, to form a firestop material as mentioned above and containing the polymer foam precursors, as well as the flame-retardant means.

This invention relates to the use of such a firestop material for caulking an opening intended to receive lines, sheaths, cables or others.

Finally, the invention also relates to the use of such a firestop material as construction material or surface coating.

The advantages of the present invention lie in the fact that the firestop material is designed in such a way that, when it is subjected to a temperature rise due to a fire, a protective charred layer forms at the surface thereof. Such a charred layer has a good mechanical strength and involves formation of a ceramized skin that protects the material.

Another advantage is that the firestop material consists of a polymer foam containing no halogenated compound, which allows to prevent, during combustion of the material, discharges harmful to man and to his environment, more particularly discharges that are polluting, noxious, toxic, corrosive or harmful to the ozone layer.

Yet another advantage lies in the fact that it is possible, by judiciously selecting the constituents of the polymer foam, to produce a firestop material in form of a more or less flexible or even rigid foam, perfectly suited for the use it is intended for.

According to another advantage, the firestop material is designed to be able to take the place of the protective covering of the copper conductor(s) of an electric cable and/or the place of a sheath within which such a cable is arranged, in case of melting of such a covering, such a cable or such a sheath under the effect of the heat of a fire.

Other features and advantages of the present invention will be clear from reading the description hereafter in connection with embodiments given by way of non limitative examples.

DETAILED DESCRIPTION

The present invention relates to the sphere of materials designed to present fire behaviour properties (resistance and reaction).

The invention thus relates to a firestop material consisting of a polymer foam.

According to a first feature of the invention, this polymer foam contains no halogenated compound.

It can be noted that this polymer foam is of expansible type, preferably water expansible. This advantageously allows to achieve expansion of such a foam without requiring any propellant gas.

A first embodiment consists in that the polymer foam is made up of a polyisocyanurate foam, a polyethylene foam, a PVC foam or a formophenolic foam.

However, and according to a preferred embodiment of the invention, this polymer foam is a polyurethane foam that is a two-constituent foam made from, on the one hand, at least one polyol and, on the other hand, at least one isocyanate.

According to a first feature, such a polyol has a viscosity, at 25° C., ranging between 200 and 1000 mPa·s, preferably between 400 and 650 mPa·s.

Such a viscosity allows, as explained hereafter, to incorporate the flame-retardant means with a high filling rate.

According to another feature, such a polyol has an OH number ranging between 200 and 500.

Another feature lies in that the polyol is selected in such a way that the polymer foam is more or less flexible or even rigid, depending on the application considered for such a foam. Such a selection also allows to produce a shape-memory and/or a viscoelastic polymer foam.

In this connection, it can be noted that, according to a preferred embodiment of the invention, such a polyol consists of a polyether polyol.

In fact, as it is known per se, polyether polyols are polyaddition products. Within the context of the present invention, good results (viscosity, flexibility) are obtained when using a polyether polyol based on molecules of ethylene glycol, glycerin, amine, trimethylpropane, pentaerytritol, sucrose, sorbitol, saccharose, or similar molecules.

In fact, such base molecules are attached to propylene oxide and/or ethylene oxide molecules to obtain such a polyether polyol.

In this connection, it can be noted that appropriate selection of such a base molecule and of the (propylene and/or ethylene) oxide molecule to which this base molecule will be attached advantageously allows to produce more or less flexible or even rigid foams.

The table hereunder gives some examples of polyether polyol compositions providing such foams with various textures (flexibility, rigidity).

| Applications | Flexible foams | | | Rigid foams | |
|---|---|---|---|---|---|
| Polyols composition | Glycerin + propylene oxide | Amine + propylene oxide | Trimethyl propane + ethylene oxide | Trimethyl propane + propylene oxide | Sucrose + propylene oxide |

A particular embodiment that gives good results consists of a polyurethane foam containing either 5 to 30% by weight of a polyether polyol with an OH number ranging between 200 and 500, or a first polyether polyol and a second polyether polyol, 5 to 30% by weight each, with an OH number ranging between 200 and 500.

According to another embodiment of the invention, the polyol can consist of a polyester polyol that results, as it is known per se, of the polycondensation of at least one polyol on at least one polyacid.

In this connection, it can be observed that, according to the invention, such a polyester polyol can then be based on at least one polyacid, notably a diacid, more particularly adipic, phthalic, maleic, succinic or a similar acid.

The polyol can be a diol (ethylene glycol, propylene glycol), a triol (trimethylpropane, glycerin) or others (pentaerytritol, sorbitol).

It has to be mentioned that the polyols used to produce a polymer foam that goes into the composition of the firestop material according to the present invention consist of polyether polyols or polyester polyols. Such polyols basically have no intrinsic fire behaviour characteristic, unlike the halogenated or phosphorus-containing polyols of the prior art.

However, quite surprisingly, these polyether polyols or these polyester polyols prove to be particularly suitable for producing a firestop material according to the present invention.

As mentioned above, the polyurethane foam is also made from at least one isocyanate, and more particularly a diisocyanate.

A preferred embodiment consists in using diphenylmethane diisocyanate (MDI), notably diphenylmethane diisocyanate 4,4, one or more isomers thereof or similar.

Another embodiment consists in using toluene diisocyanate, or an aromatic isocyanate (naphthylene diisocyanate) or an aliphatic isocyanate (hexamethylene diisocyanate).

In order to fulfil a firestop function, this polymer foam contains flame-retardant means.

According to the invention, such flame-retardant means consist of means designed to form a cohesive charred layer on the foam surface, for a temperature corresponding to that of a fire.

In this connection, it can be noted that the means for forming a charred layer consist of at least one charring agent of physical type. In fact, such a charring agent is referred to as physical when it forms, by itself and in the absence of any interaction with any other constituent of the firestop material (in particular in the absence of interaction with the polymer of the foam), a charred layer at the surface of the material, for a temperature (more particularly a high temperature) corresponding to that of a fire.

A preferred embodiment of the invention consists in that the physical charring agent is made up of at least one mineral chemical compound taking a foliated structure and able to exfoliate with the heat, more particularly for a temperature corresponding to that of a fire.

Such a foliated mineral compound is preferably of the type expansible at high temperature (more particularly at the temperature of a fire).

Thus, under the effect of the heat of a fire, such a foliated mineral chemical compound exfoliates, expands and forms a protective charred layer on the surface of the material.

By means of this expansion, this mineral chemical compound is likely to take the place of a protective covering of one or more copper conductor(s) of an electric cable and/or the place of a sheath within which such a cable is arranged, in case of degradation of said foam or of melting of such a covering, such a cable or such a sheath under the effect of the heat of a fire.

In fact, the foliated mineral chemical compound can consist of vermiculite or mica, more particularly of expansible type.

However, according to a preferred embodiment of the invention, such a foliated mineral chemical compound consists of a compound based on carbon, preferably graphite, more preferably a graphite of expansible type, notably with a thickness ranging between 200 and 400 microns.

It can be noted that adding such a foliated mineral chemical compound (more particularly expansible graphite) to the chemical composition intended to form the firestop material increases the viscosity of this composition that goes from the liquid state to the pasty state.

According to an additional feature of the invention, the means for forming a charred layer consist of at least one physical charring agent (as mentioned above, more particularly graphite, notably expansible) supplemented by at least one reactive charring agent.

In fact, such a charring agent is referred to as reactive when it forms a charred layer at the surface of the material by reacting with the polymer of the foam (more particularly with the oxygen atoms of the polymer), for a temperature corresponding to that of a fire (more particularly at high temperature).

In this connection, it can be observed that the reactive charring agent is defined by at least one organophosphate compound.

Such an organophosphate compound can consist of a phosphate compound such as a tri cresyl phosphate (TCP) or a similar compound. However, such an organophosphate compound can also consist of a polyphosphate compound such as an ammonium polyphosphate (APP) or a similar compound.

Another feature of the invention is that the means for forming a charred layer (physical charring agent and reactive charring agent) are supplemented by at least one inorganic type flame retardant.

In this connection, it can be noted that such an inorganic flame retardant can consist of a mineral filler, notably a glass powder mixture, a calcium silicate, talc or a similar filler.

Such a mineral filler is intended to melt at high temperature and to form a skin, notably in form of a vitreous layer.

Such an inorganic flame retardant can also consist of a compound whose decomposition is of endothermic type, under the effect of a temperature corresponding to that of a fire.

Such an endothermic-decomposition compound can consist of a metal oxide, more particularly a zinc borate, an aluminium oxide, a magnesium oxide or a similar oxide.

It can be noted that the firestop material according to the invention can comprise an inorganic flame retardant consisting of either such a mineral filler or such an endothermic-decomposition compound.

However, according to a preferred embodiment of the invention, the firestop material comprises an inorganic flame retardant consisting of such a mineral filler as well as an inorganic flame retardant consisting of such an endothermic-decomposition compound.

In this connection, it can be observed that this endothermic-decomposition compound then behaves like a fluxing agent that stabilizes the aforementioned skin by providing cohesion of this new barrier.

According to another feature of the invention, the means for forming a charred layer (physical charring agent and reactive charring agent) and the inorganic type flame retardant come in form of additives that are incorporated before, during or after polymerization of the polymer foam, but preferably before such polymerization.

In this connection, it can be observed that selecting a polyol such as the aforementioned one, more particularly a low-viscosity polyol (notably from 400 to 650 mPa·s), advantageously allows good incorporation of these additives, notably with a high filling rate.

According to another feature of the invention, the means for forming a charred layer (physical charring agent and reactive charring agent) and the inorganic type flame retardant surprisingly allow to obtain a synergism in the behaviour of the material toward fire and temperature.

In fact, according to another feature of the invention, the physical charring agent, the reactive charring agent and the inorganic type flame retardant are so selected as to intervene at different stages of the attack by the fire or the temperature on the firestop material, notably successively as the temperature increases. These different interventions lead to the formation of a cohesive charred layer on the foam surface, thus providing protection of the material.

In this connection, it can be observed that, as the temperature increases, the physical charring agent first intervenes by leading to the formation of a charred layer without real mechanical strength. This mechanical strength is provided, during a new temperature increase, by the reactive charring agent. Finally, during a new temperature increase, the inorganic type flame retardant forms a skin that can be stabilized by means of an endothermic-decomposition compound (aforementioned fluxing agent).

The present invention also relates to a chemical composition intended, after expansion and drying, to form a firestop material having the aforementioned features.

In fact, such a chemical composition contains the precursors of a polymer foam. Such precursors consist for example, as mentioned above in the case of a polyurethane foam, on the one hand, of at least one polyol of the aforementioned type and, on the other hand, of at least one isocyanate of the aforementioned type.

This chemical composition also contains means for forming a charred layer, consisting of at least one physical charring agent, notably supplemented by at least one reactive charring agent as mentioned above.

Said chemical composition can also comprise at least one inorganic type flame retardant as mentioned above.

According to another feature of this composition, it furthermore contains agents intended to provide expansion thereof. With a view to environmental protection, such agents are selected in such a way as to avoid CFCs or their substitutes and they can then be made up of water, n-pentane or others.

This chemical composition can also contain a foam stabilizing agent, more particularly consisting of a silicone derivative, for example poly siloxane polyether or similar. Such a stabilizing agent is used, on the one hand, to add stability to the foam bubbles and, on the other hand, to obtain a homogeneous network of bubbles in the material.

Additionally, said chemical composition can also contain a catalyst (notably di butyl dilaurate or similar).

Such a catalyst advantageously allows the formation of the firestop material to be accelerated after mixing of the various constituents thereof, notably when such a mixture is achieved on site.

The appended tables give a certain number of products mentioned above and likely to be incorporated to the aforementioned chemical composition that forms, after expansion and drying, said firestop material. It can be observed that these products are given in percent by mass of the corresponding product in the final chemical composition.

More particularly:

Table 1 corresponds to value ranges of percentages by mass of said products,

Table 2 corresponds to an optimum formulation of the chemical composition according to the invention, Tables 3 and 4 correspond to chemical composition formulations corresponding to two other embodiments of the invention.

It can be noted that such a chemical composition can be designed to be packaged, notably under vacuum, in a vessel prior to being extracted therefrom when making the firestop material.

In this connection, it can be observed that the firestop material is notably based on a two-constituent polymer foam so that the vessel intended to contain said chemical composition comprises at least two different compartments, one intended to receive one of the constituents and the second intended to receive the other constituent.

Thus, a first compartment of this vessel contains the isocyanate(s) whereas a second compartment contains the polyol(s) and the additives (physical charring agent, reactive charring agent, stabilizing agent, expansion agent, inorganic flame retardant, . . . ).

It can be observed that these two compartments are isolated from one another and that their content is mixed only for making the firestop material.

Thus, to obtain this material, the constituents of said chemical composition are extracted from the compartments of the vessel, notably by flowing or (preferably) by injection.

Said vessel therefore comprises an extrusion system allowing extraction of the constituents of such a two-constituent chemical composition.

The invention also relates to the use of the firestop material described above for caulking an opening provided in a building. Such an opening comes in form of a groove, an emerging or a through hole, and it is more particularly intended to receive lines, sheaths, cables (notably electric) or others.

For such a use and according to a preferred embodiment of the invention, the composition (contained in a vessel, notably under vacuum) is injected into such an opening wherein said lines, sheaths, cables or others have already been arranged. This composition will then expand and dry so as to form said firestop material according to the invention.

However, according to another embodiment, the firestop material according to the invention can be cast in a mould so as to form (after expansion and drying) a block, a brick or similar, likely to be cut up in order to be adjusted to the configuration of the opening.

The invention then relates to a method for caulking such an opening by means of a firestop material of the aforementioned type.

Such a method then consists either in injecting into this opening a chemical composition of the aforementioned type and intended to form a firestop material of the aforementioned type (after expansion and drying), or in arranging in said opening at least one element (brick, block or similar) consisting of such a firestop material.

According to another feature, the invention also relates to the use of the firestop material described above as construction material.

In this connection, it can be observed that such a construction material can be used for making:
a structural element (partition, plate, sandwich construction or similar),
a covering element (slab, plate, false ceiling or similar),
an insulating element (heat and/or sound),
a closing element (door),
a furniture element (wall, door or casing of a piece of furniture),
fittings (notably for bedding, seats, for example of motor vehicles).

Such a firestop material can thus be used as construction material in the car industry, the shipbuilding industry, the railway industry, the naval aviation industry, the construction industry, the furniture industry and the interior equipment industry.

In this connection, it can be observed that this firestop material can here also be cast in a mould so as to form (after expansion, drying and mould opening), such an element or such a fitting.

Furthermore, the invention also relates to the use of the firestop material described above as surface coating. Coating of such a surface can for example be achieved by spraying, more particularly by coating such a surface with such a firestop material.

Although the invention has been described in connection with a particular embodiment, it is of course clear that it is not limited thereto and that various changes in the shapes, materials and combinations of these different elements can be provided without departing from the scope and the spirit of the invention.

TABLE 1

| Product | Percentage |
|---|---|
| Polyol polyether | 20-33 |
| Diisocyanate | 20-33 |
| Expansible graphite | 13-22 |
| Tri cresyl phosphate TCP | 2-11 |
| Ammonium polyphosphate APP | 0-8 |
| Zinc borate | 4-10 |
| Glass powder mixture | 0-10 |
| Di butyl dilaurate | 0.2-1.2 |
| Poly siloxane polyether | 1-8 |

TABLE 2

| Product | Percentage |
|---|---|
| Polyol polyether | 27.2 |
| Diisocyanate | 27.2 |
| Expansible graphite | 17.5 |
| Tri cresyl phosphate TCP | 4.4 |
| Ammonium polyphosphate APP | 4.4 |
| Zinc borate | 6.6 |
| Glass powder mixture | 6.6 |
| Di butyl dilaurate | 0.9 |
| Poly siloxane polyether | 5.2 |

TABLE 3

| Product | Percentage |
|---|---|
| Polyol polyether | 30.9 |
| Diisocyanate | 30.9 |
| Expansible graphite | 17.5 |
| Tri cresyl phosphate TCP | 8.8 |
| Zinc borate | 8 |
| Di butyl dilaurate | 0.9 |
| Poly siloxane polyether | 3 |

TABLE 4

| Product | Percentage |
|---|---|
| Polyol polyether | 28.75 |
| Diisocyanate | 28.75 |
| Expansible graphite | 15 |
| Tri cresyl phosphate TCP | 6 |
| Ammonium polyphosphate APP | 2.8 |
| Zinc borate | 6.6 |
| Glass powder mixture | 6.6 |
| Di butyl dilaurate | 0.5 |
| Poly siloxane polyether | 5 |

The invention claimed is:
1. A firestop material comprising:
a polymer foam containing no halogenated compound; and flame-retardants that form a cohesive charred layer on the foam surface, for a temperature corresponding to that of a fire, the flame retardants comprising:

at least one physical charring agent comprising at least one mineral chemical compound taking a foliated structure and able to exfoliate with the heat, the at least one mineral chemical compound being free of expansible graphite, wherein the at least one physical charring agent forms, by itself and in the absence of any interaction with any other constituent of the firestop material, a charred layer, at least one reactive charring agent that forms, by reacting with the polymer of the foam, a charred layer on the material surface, and at least one inorganic flame retardant comprising a mineral filler and a metal oxide whose decomposition, under the effect of a temperature corresponding to that of a fire, is endothermic, wherein the inorganic flame retardant is such that the mineral filler can melt at high temperature and form a skin and an endothermic-decomposition compound of the metal oxide stabilizes the skin, and wherein the physical charring agent, the reactive charring agent and the inorganic flame retardant intervene at different stages of the attack by the fire or the temperature on the firestop material, successively as the temperature increases.

2. The firestop material as claimed in claim 1, wherein the at least one mineral chemical compound comprises vermiculite or mica.

3. The firestop material as claimed in claim 1, wherein the at least one mineral chemical compound comprises expansible vermiculite or expansible mica.

4. The firestop material as claimed in claim 1, wherein the at least one mineral chemical compound is expansible at a temperature corresponding to that of a fire.

* * * * *